United States Patent Office 2,733,968
Patented Feb. 7, 1956

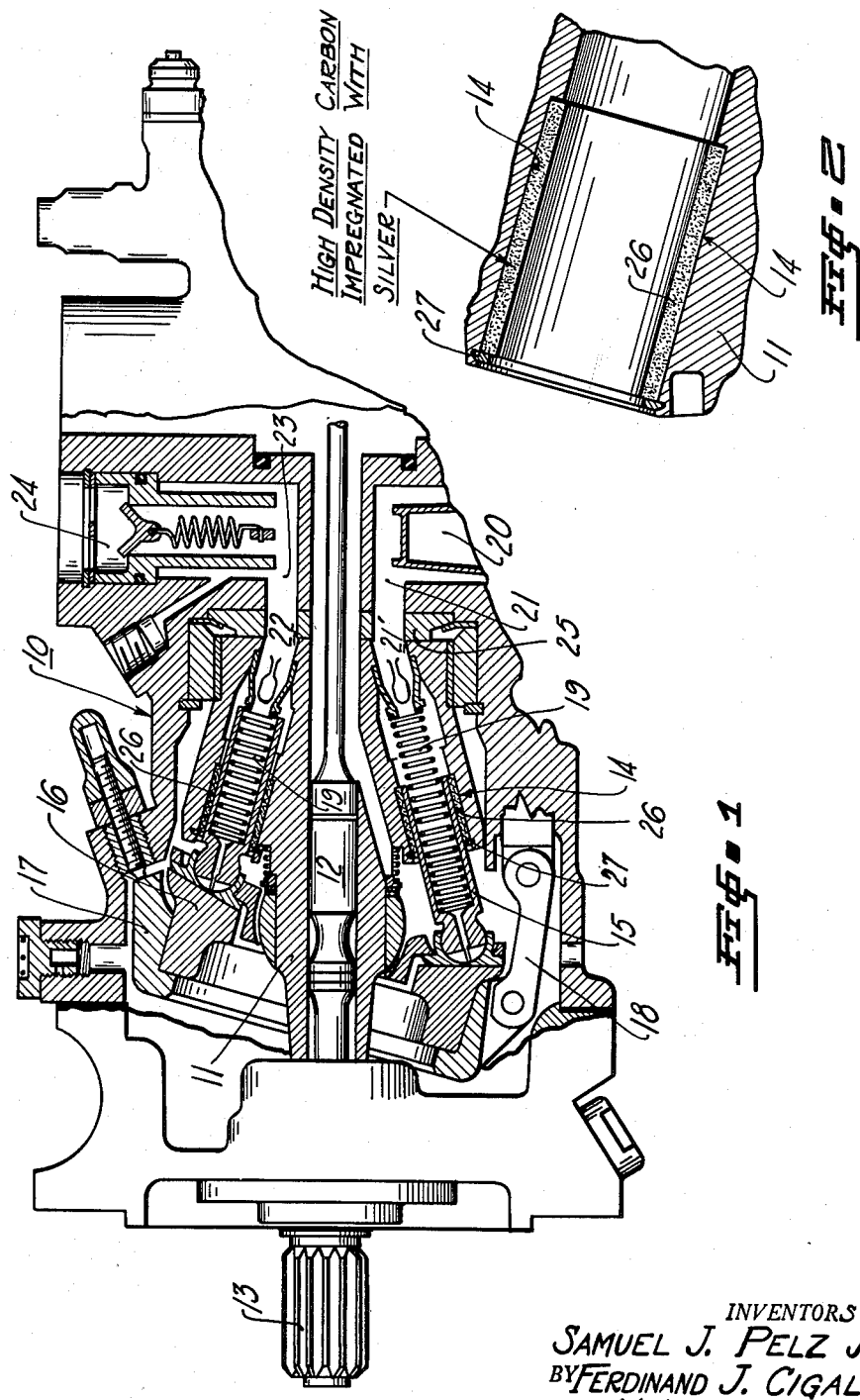

2,733,968

WEAR RESISTANT BUSHING OR LINER FOR THE PLUNGER CYLINDER OR BORES OR PUMPS HANDLING WATER-CONTAMINATED FUEL

Samuel J. Pelz, Jr., and Ferdinand J. Cigal, South Bend, Ind., assignors to Bendix Aviation Corporation, South Bend, Ind., a corporation of Delaware Application July 5, 1952, Serial No. 297,334

5 Claims. (Cl. 309—3)

Reciprocating plunger type pumps used for pressurizing fuel to engines for powering aircraft, particularly jet engines, are required to work for long periods of service without danger of seizure in their cylinder bores at high speeds and pressures over a wide range of temperatures. The problem of plunger or piston seizure became acute when pump manufacturers were called upon to supply pumps for jet engine fuel systems utilizing a fuel control device for metering fuel to high pressure spray nozzles or atomizers which discharge fuel continuously into the burners at all altitudes. Here the size and weight of the unit become important considerations.

A type of pump which has met with favor from a control, manufacture and installation standpoint utilizes a rotating body and plunger assembly with a nonrotating wobble plate whose effective angle is controlled by a servo piston responsive to the drop across a metering device modified as a function of altitude and/or other parameters which affect engine operation. When these pumps first came into use by jet engine manufacturers, it soon became evident that some type of friction or bearing material other than the base metal (the metal of which the body is made) was necessary to prevent the plungers from seizing or sticking in their bores, in order to meet specifications as to speed, delivery pressure and temperature range without failure over periods of service between overhaul. Such requirements must be met irrespective of water-contaminated fuel, something that must be tolerated, since failures have been traced to water in the fuel in spite of normal precautions to avoid such contamination. Water as a lubricant is less effective than hydrocarbon fuels and hence heat generated thru friction will increase as the degree or percentage of water-to-fuel increases. This problem gave rise to the present invention. Various methods of cylinder bore treatment were tried without satisfactory results. Nitriding and other types of coatings having a low coefficient of friction were tried, but they were found to wear rapidly, and once the base metal became exposed, the plungers were again vulnerable to water-contaminated fuels. Sleeves or bushings of sintered bronze containing graphite, carbon-impregnated graphite and various other materials were tried with varying degrees of success, but all had certain inherent objections, such as brittleness, difficulty of assembly without damage and failure to withstand water-contaminated fuel for the required length of service.

The object of the instant invention, therefore, is to provide a bushing or lining for reciprocating plunger cylinders or bores which will withstand the friction incidental to plunger operation in water-contaminated fuels without causing binding or seizure of the plungers over a relatively long period of service.

In the drawings:

Figure 1 is a view in section and elevation of a pump embodying the invention; and Figure 2 is an enlarged section of one of the plunger cylinders or bores and its bushing or liner.

The pump as illustrated in Figure 1, comprises a housing or main body casting, generally indicated at 10, in which is mounted a rotor 11. Rotation is imparted to the rotor by means of a drive shaft 12, which is provided with a driving spline or pinion 13 at the outer end thereof. Plunger cylinders or bores 14 are formed in the rotor 11, and mounted for reciprocation therein are pumping plungers or pistons 15. The plungers are moved inwardly or have pumping strokes imparted thereto by means of a wobble plate 16, supported by a backing plate 17, which is connected by means of link 18 with a servo piston not shown, but which is responsive to the drop across a fuel metering device modified as a function of altitude and/or other engine parameters as may be found as desirable. The plungers 15 are urged outwardly or toward return position by means of springs 19. Fuel to be pumped enters at 20 and flows by way of channel 21 and port 21' into the pumping cylinders as the plungers make their suction strokes, and fuel is discharged from the plunger bores or cylinders through port 22, channel 23 and outlet 24 as the plungers make their pumping strokes. The ports 21' and 22 are formed in a port insert member 25.

The plunger bores or cylinders 14 are each provided with a bushing or liner 26, note particularly Figure 2, which is comprised of high density carbon impregnated with silver. Rigid tests have demonstrated that the high density carbon will withstand the service incidental to the rapid reciprocation of the plungers in water-contaminated fuel over long periods of time with no appreciable wear, while the silver phase renders the bushing less susceptible to chipping or cracking and facilitates installation without damage. The respective percentage of carbon and silver may vary within limits; in practice, however, approximately six to ten percent by weight of silver has given the most effective results.

Any suitable method may be adopted in forming the silver-impregnated carbon sleeve or bushing. One method is to first mold and bake the carbon bushing and then introduce the silver in molten state into an evacuated chamber in which the bushing is confined. This facilitates impregnation of the silver into the somewhat porous mass of carbon.

In arriving at the silver-impregnated carbon sleeve or bushing, I have discovered that for installations where a certain degree of brittleness may be tolerated, carbon alone, preferably of high density, may be found satisfactory. Tests have demonstrated the ability of carbon to withstand water-contaminated fuel, and bushings of such material show little wear after relatively long periods of service.

Mounting of the sleeve or bushing without damage to the rotor or sleeve requires proper technique. In practice, the rotor casting or body is heated to approximately 300 to 350° F. Preferably, since it apparently facilitates insertion without requiring excessive heating of the rotor, the sleeve is chilled in a mixture or solution of Dry Ice ($CO_2$) and a freeze-resistant liquid such as gasoline. It is then inserted in the bore, and when the parts attain normal temperatures, a tight fit ensues. To ensure against end play, a snap ring 27 is installed in a suitable annular groove formed in the outer end of the bore.

Pumps equipped with bushings of the type herein described may use plungers made of any suitable grade of carbon steel, such as tool steel, which do not require any special surface treatment, such as plating or nitriding. The ability of the bushings to withstand water-contaminated fuel over long periods of service without sticking or failure is outstanding and has solved a baffling problem.

Limited changes in proportions and the method of installation are obviously permissible to suit requirements.

We claim:

1. In a pump of the reciprocating plunger type having a plunger bore or cylinder, a sleeve or bushing in said cylinder comprised predominantly of carbon impregnated with silver.

2. In a pump of the reciprocating plunger type, a metallic member formed with one or more plunger cylinders or bores, and a sleeve or bushing in each bore comprised of high density carbon impregnated with from six to ten parts by weight of silver.

3. A bushing for a cylinder of a reciprocating pump comprising a major portion of carbon and a minor portion of silver.

4. A bushing for a cylinder of a reciprocating pump comprising a carbon base impregnated with from 6 to 10 parts by weight of silver.

5. A bushing for a cylinder of a reciprocating pump comprising a major portion of high density carbon and a minor portion of silver.

References Cited in the file of this patent

UNITED STATES PATENTS

| Number | Name | Date |
|---|---|---|
| 656,652 | Markey | Aug. 28, 1900 |
| 982,739 | Moore | Jan. 24, 1911 |
| 1,081,257 | Sprado | Dec. 9, 1913 |
| 1,301,675 | Fessenden | Apr. 22, 1919 |
| 1,329,348 | Copeland | Jan. 27, 1920 |
| 1,494,169 | Johnson | May 13, 1924 |
| 2,027,788 | Ridgeway et al. | Jan. 14, 1936 |
| 2,117,550 | Eynon et al. | May 17, 1938 |
| 2,253,401 | Slepian | Aug. 19, 1941 |
| 2,255,120 | Kiefer et al. | Sept. 9, 1941 |
| 2,294,404 | Hensen | Sept. 1, 1942 |
| 2,319,240 | Larsen et al. | May 18, 1943 |
| 2,413,115 | Sheehan | Dec. 24, 1946 |
| 2,470,264 | Richardson | May 17, 1949 |
| 2,482,205 | Potts | Sept. 20, 1949 |
| 2,575,394 | Rice | Nov. 20, 1951 |
| 2,583,974 | Summers | Jan. 29, 1952 |

FOREIGN PATENTS

| Number | Country | Date |
|---|---|---|
| 520,446 | Great Britain | Apr. 24, 1940 |